United States Patent [19]
Kerr

[11] Patent Number: 6,109,845
[45] Date of Patent: Aug. 29, 2000

[54] TRAILER RECOVERY VEHICLE

[75] Inventor: Robert Douglas Kerr, Willow Beach, Canada

[73] Assignee: Blue Star Trailer Rentals, Inc., Ontario, Canada

[21] Appl. No.: 09/137,597

[22] Filed: Aug. 21, 1998

[51] Int. Cl.[7] ...................................................... B60P 3/07
[52] U.S. Cl. ............................. 410/65; 410/30; 410/56; 410/78
[58] Field of Search .................................. 410/30, 56, 65, 410/28, 3, 4, 7; 414/427, 430; 280/656, 402; 296/26.09

[56] References Cited

U.S. PATENT DOCUMENTS

| | | | |
|---|---|---|---|
| D. 278,615 | 4/1985 | Law et al. | |
| 2,623,759 | 12/1952 | Forbas | 410/30 |
| 2,821,152 | 1/1958 | Podgajny | 410/65 |
| 2,933,053 | 4/1960 | Mellam | 410/65 X |
| 2,971,478 | 2/1961 | Dilworth et al. | |
| 3,048,437 | 8/1962 | Linder | |
| 3,374,010 | 3/1968 | Crockett et al. | 280/656 X |
| 3,430,791 | 3/1969 | Moss | 280/656 X |
| 3,486,467 | 12/1969 | Coulson | 410/65 X |
| 4,362,317 | 12/1982 | Brockman | |
| 4,611,962 | 9/1986 | Braley et al. | 410/57 |
| 4,642,007 | 2/1987 | Marshall et al. | 410/78 |
| 4,650,381 | 3/1987 | Durkin | 410/43 |
| 5,017,064 | 5/1991 | Kirwan et al. | 410/53 |
| 5,173,018 | 12/1992 | Kissel et al. | 410/30 |
| 5,511,490 | 4/1996 | Fendall et al. | 410/564 |

*Primary Examiner*—Stephen T. Gordon
*Attorney, Agent, or Firm*—Troutman Sanders LLP; Gerald R. Boss, Esq.

[57] ABSTRACT

A trailer recovery vehicle is provided for transporting a trailer towed by a tractor. The trailer recovery vehicle includes a generally horizontal wheeled support platform for mounting underneath the trailer for supporting the trailer in a horizontal position and a wheel brace for engaging a wheel of the trailer to prevent lateral shifting when the trailer is carried by the carrier support platform. The trailer recovery vehicle also includes a pivotable connector for connecting the support platform to the tractor while the trailer is connected to the tractor via a fifth wheel connector, enabling the support platform and trailer to be transported simultaneously so that the trailer mounted to the tractor is supported above the road surface and transported by the trailer recovery vehicle when the tractor pulls the trailer recovery vehicle.

15 Claims, 4 Drawing Sheets

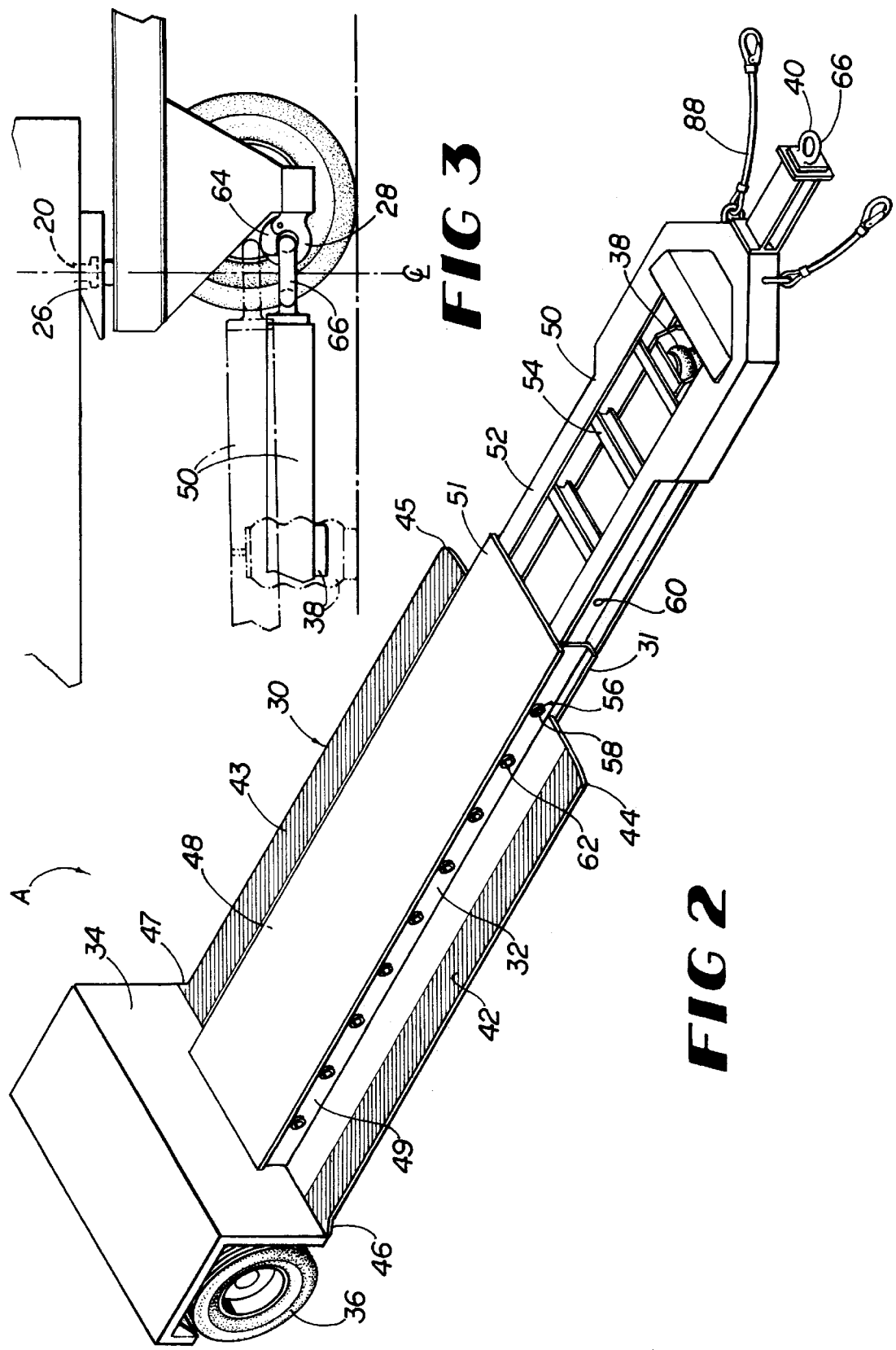

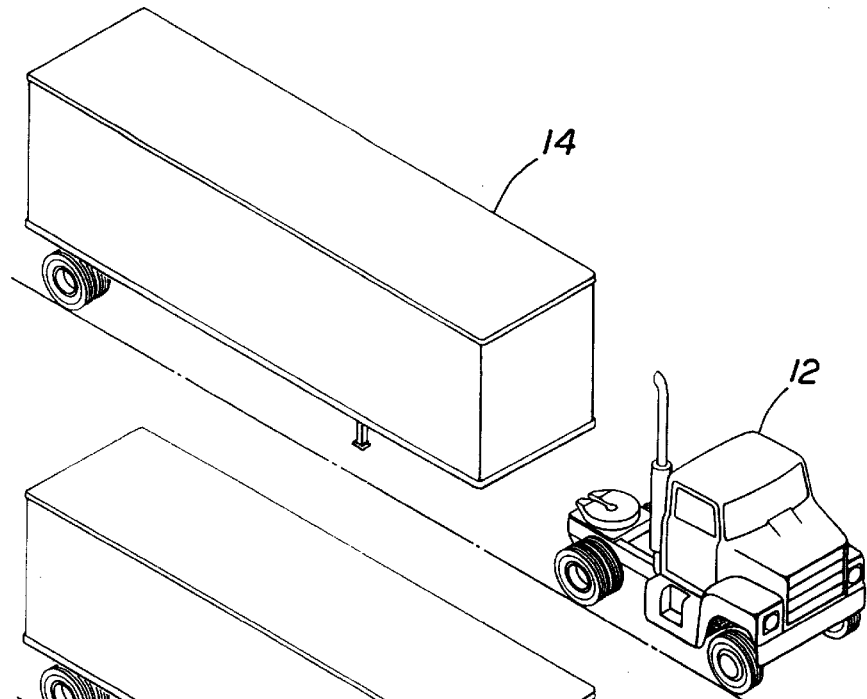
FIG 5
FIG 6
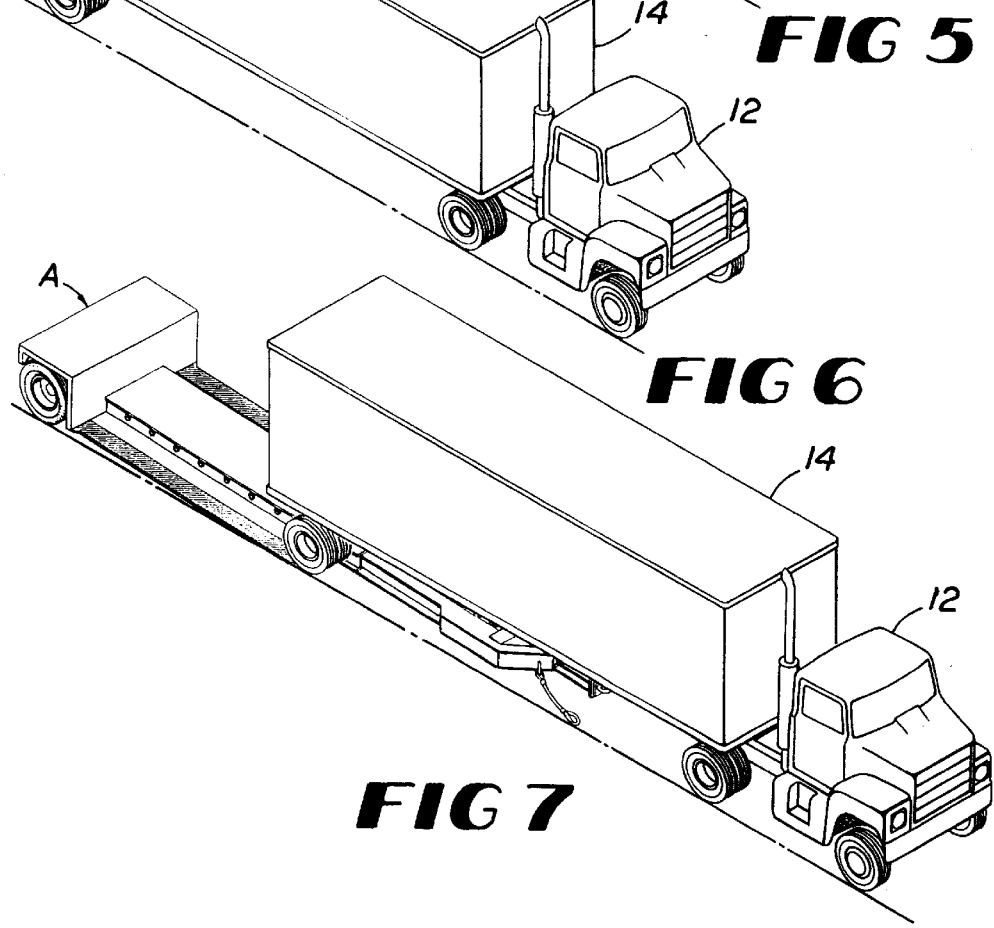
FIG 7

TRAILER RECOVERY VEHICLE

BACKGROUND OF THE INVENTION

1. Technical Field

This invention relates generally to a towing vehicle and in particular to a trailer recovery vehicle for supporting and towing a trailer which is generally unsuitable for traveling over highways in a manner which enables a driver of a tractor to operate the tractor in a normal manner while towing the trailer.

2. Description of the Prior Art

Through the twentieth century, tractor trailer trucks have become an increasingly important part of the commercial transport system which provides for the shipment of raw materials, produce and manufactured goods. Many trailers have been in use for decades, and as time has gone by, inevitably, a number of them have deteriorated to a point where they are no longer roadworthy. Additionally, periodic changes in highway safety laws and regulations have resulted in a large number of trailers which can no longer be legally transported on the national highway systems. Many of these unroadworthy trailers, now effectively stranded in truckyards and other remote locations, could be reconditioned or recycled if they could be transported to the appropriate facilities. Accordingly, a need exists for a system to allow for safe and legal transportation of these unroadworthy trailers.

Prior art systems have been developed to allow the transport of trailers. For example, U.S. Pat. No. 4,611,962 discloses a system wherein a plurality of flat bed trailers may be stacked for simultaneous transport. U.S. Pat. No. 2,971,478 discloses a flatbed railway vehicle adapted for transport of semitrailers. While each of these designs are suitable for their intended purpose, neither would be useful for the highway towing of a trailer such as a semitrailer.

Therefore, it is an object of the present invention to provide a recovery vehicle and method for legally towing a trailer which is unsafe or would otherwise fail to meet current highway safety standards.

It is a further object of the present invention to provide a recovery vehicle and method for towing a trailer which is stable and results in a minimal increase in the height of the trailer to prevent clearance problems with bridges and other overhanging obstacles.

It is yet another object of the present invention to provide a recovery vehicle and method for easily towing a trailer which may be adapted to fit a variety of trailers and which allows a trailer to be transported while normally connected to a tractor, thereby providing increased stability and normal towing operation.

SUMMARY OF THE INVENTION

The above objectives are accomplished according to the present invention by providing a trailer recovery vehicle for transporting a trailer, such as a semitrailer, towed by a tractor. The trailer recovery vehicle includes a generally horizontal wheeled support platform for mounting underneath the trailer and for supporting the trailer in a horizontal position. A trailer wheel brace is carried by the support platform for bracing a wheel of the trailer to prevent lateral shifting of the trailer when the trailer is carried by the support platform. The trailer recovery vehicle also includes a connector for connecting the support platform to the tractor, enabling the support platform and trailer to be transported simultaneously in a normal operating manner. Thus the trailer mounted to the tractor is supported above the road surface and transported by the trailer recovery vehicle when the tractor pulls the trailer recovery vehicle.

The aforementioned and other aspects, objects and advantages of the present invention are described in the detailed description and attached illustrations which follow.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown, and wherein:

FIG. 2 is a perspective view of a trailer recovery vehicle in accordance with the present invention.

FIG. 3 is a side sectional view through the connection of a tractor to a trailer recovery vehicle and a trailer illustrating a common pivotal axis in accordance with the present invention.

FIG. 5 is a perspective view illustrating the method for connecting a trailer to a tractor for transport in accordance with the present invention.

FIG. 6 is a perspective view illustrating a trailer connected to a tractor for transport in accordance with the present invention.

FIG. 7 is a perspective view illustrating the method for positioning a trailer upon a trailer recovery vehicle for transport in accordance with the present invention

DETAILED DESCRIPTION OF THE INVENTION

Figure 1:
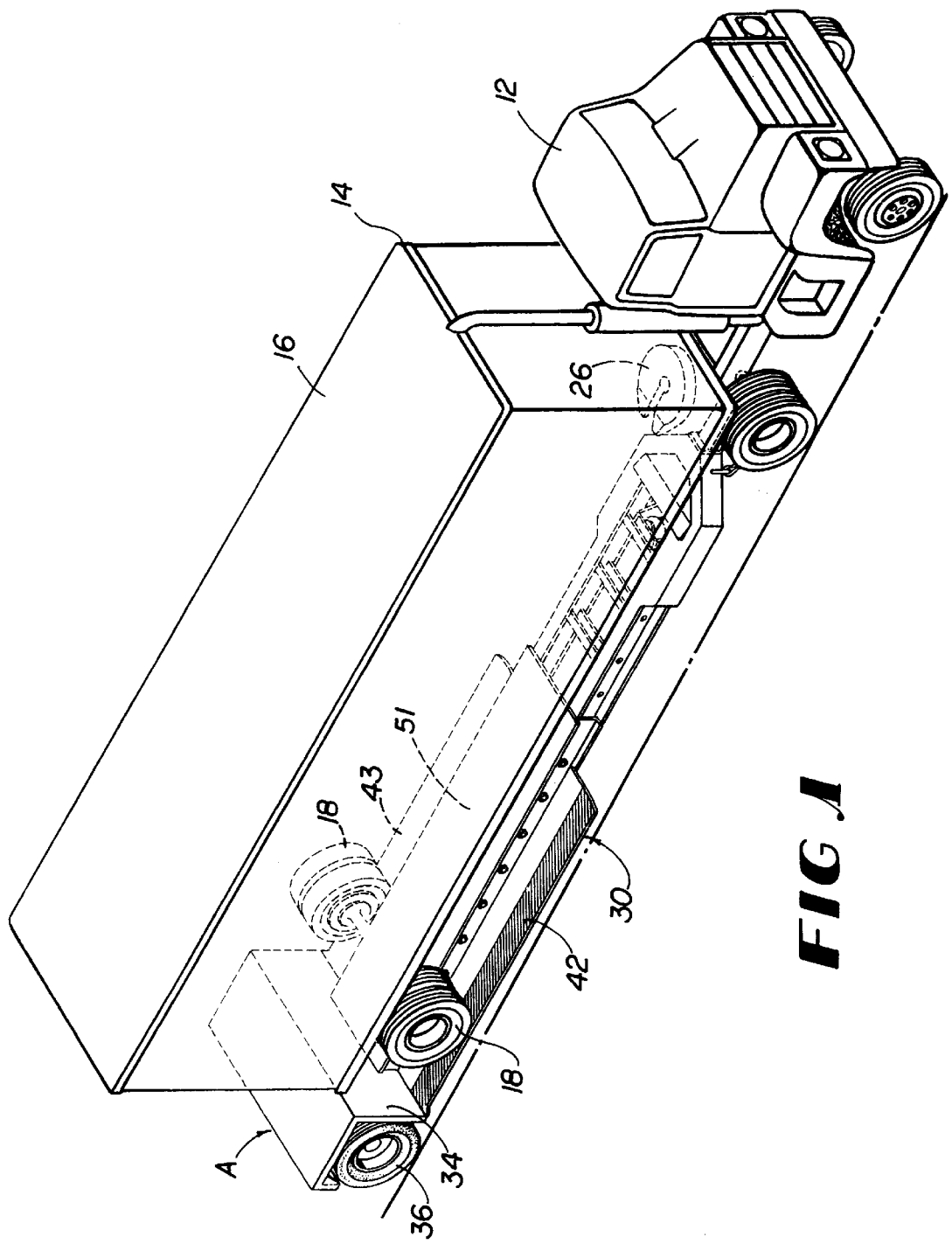
FIG. 1 is a overhead perspective view of a trailer recovery vehicle transporting a trailer attached to a tractor in accordance with the present invention.

Referring now in more detail to the drawings, the invention will now be described. FIG. 1 illustrates a trailer recovery vehicle A which includes support platform 30 for supporting trailer 14, forward telescoping member 50 for matching the length of support platform 30 to that necessary to tow trailer 14 and a trailer recovery vehicle connector 40 for pivotable connection to tractor unit 12.

As shown in FIGS. 1 and 3, trailer recovery vehicle A is provided for connection to a standard tractor unit 12 towing a standard trailer 14, such as a semitrailer commonly used in tractor trailer combinations. Trailer 14 includes container portion 16 for storing cargo, trailer wheels 18 and trailer fifth wheel connector pin 20 for connection to tractor unit 12. Tractor unit 12 includes a standard fifth wheel connector 26 for receiving fifth wheel connector pin 20 for connecting to trailer 14.

Figure 4:
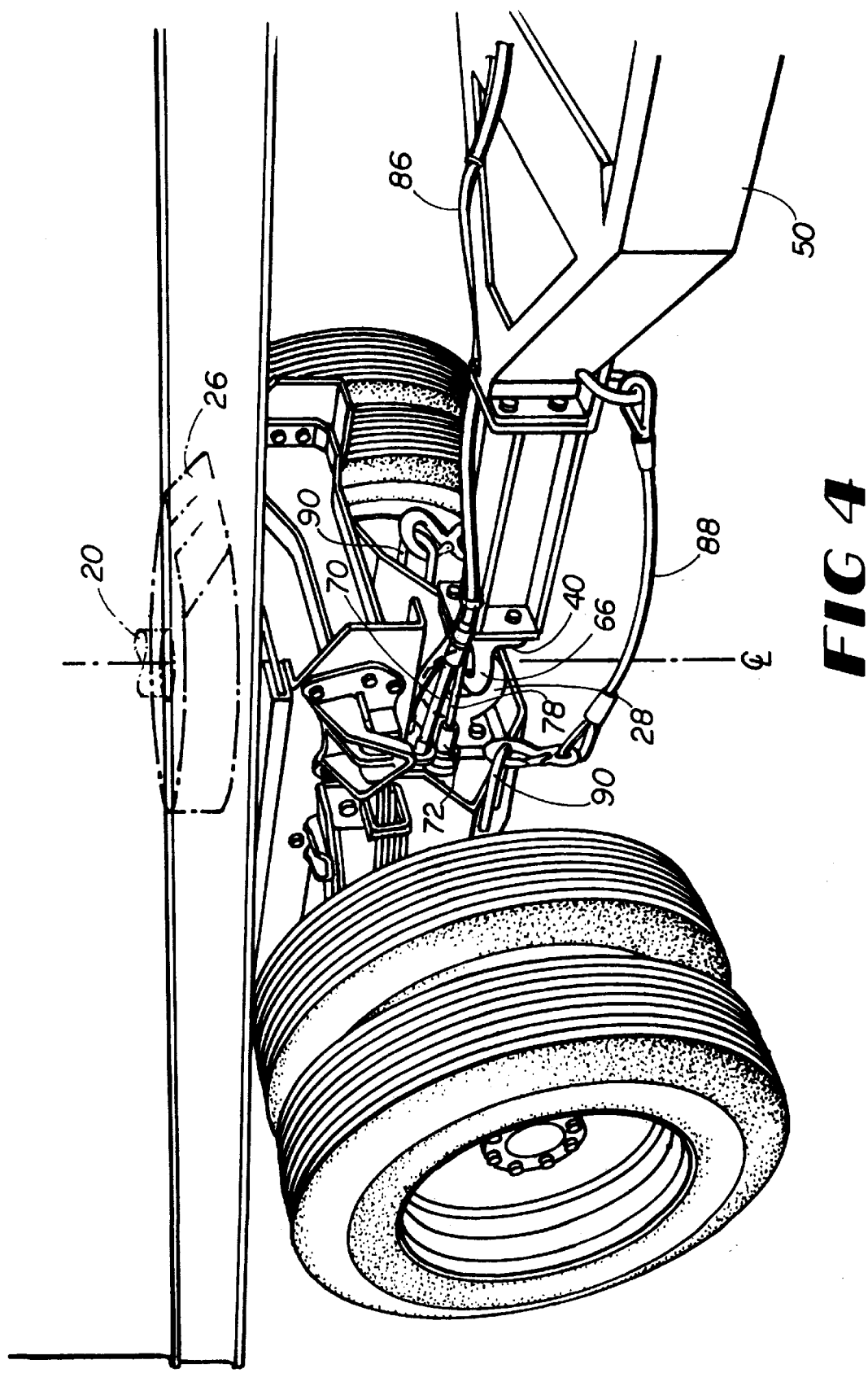
FIG. 4 is a side perspective view of the connection of a trailer recovery vehicle and a trailer to a tractor in accordance with the present invention.

As shown in FIGS. 1, 3 and 4, trailer 14 is carried upon the trailer recovery vehicle A while simultaneously connected to tractor unit 12 via the tractor's pivotable fifth wheel connector 26. As shown more closely in FIG. 3, the pivotable connections between the trailer 14 and the tractor unit 12 and between the trailer recovery vehicle A and the tractor unit 12 should be in vertical axial alignment. This alignment is important since it allows the tractor unit 12 to be steered during normal operation without binding. This arrangement allows the trailer 14 to be legally transported as cargo upon trailer recovery vehicle A, thereby avoiding the necessity that trailer 14 be roadworthy or that it meet highway safety standards.

As shown in FIG. 2, support platform 30 includes support platform frame 31, wheel support tracks 42 and 43 for supporting the wheels of trailer 14 and axle housing 34 for supporting trailer recovery vehicle wheels 36. Wheel support tracks 42 and 43 extend horizontally along a general length of support platform frame 31. Wheel support tracks 42 and 43 include support track front sides 44 and 45 and support track rear sides 46 and 47 respectively. Axle housing 34 extends vertically upward from support track rear sides 46 and 47 to define a stop preventing trailer 14 from rolling off of support platform 30. Axle housing 34 also includes a suspension assembly and axle (not shown) for supporting trailer recovery vehicle wheels 36. When trailer recovery vehicle A is not connected to tractor 12, support platform 30 inclines downwardly from a height defined by trailer recovery vehicle wheels 36 to the ground where support track front sides 44 and 45 abut the ground. In this position, support track front sides 44 and 45 define a ramp enabling trailer 14 to be rolled onto wheel support tracks 42 and 43. Preferably, wheel support tracks 42 and 43 are sized to receive the wheels of a standard semitrailer and may be constructed of either a solid sheet of steel or a steel grate to conserve weight.

Axle housing 34 also includes a suspension assembly and axle (not shown) for supporting trailer recovery vehicle wheels 36 and an air brake assembly (not shown) for providing the ability to slow or stop trailer recovery vehicle A during transport. As shown in FIG. 2 the air brake assembly is provided with compressed air from tractor unit 12 via pneumatic lines 86 extending along the length of trailer recovery vehicle A to trailer recovery vehicle connector 40 which may be connected to tractor pneumatic supply line 70. Axle housing 34 also includes signal and brake lights (not shown) mounted along its rear edge, which may be connected to tractor unit 12 via a signal control harness 78 extending along the length of the trailer recovery vehicle A to trailer recovery vehicle connector 40.

Also shown in FIG. 2, support platform 30 is a drop frame type platform wherein trailer recovery vehicle wheels 36 are located behind support platform frame 31. Since wheel support tracks 42 and 43 are not disposed directly over trailer recovery vehicle wheels 36, they may be located at a height below that which would be required to clear trailer wheels 36. Thus, trailer 14 may be supported off of a road while adding a minimum additional height, thereby avoiding clearance problems with bridges, overhanging wires or other obstacles.

Support platform 30 also includes trailer wheel brace 32 which is disposed between wheel support tracks 42 and 43 for providing lateral support to trailer wheels 18 and has a width slightly smaller than the distance between the inner wheels of a standard trailer. Trailer wheel brace 32 may include a wheel well disposed within wheel support tracks 42 and 43 or a vertical brace carried by wheel support tracks 42 and 43 or carried by support frame 31 adjacent wheel support tracks 42 and 43. Preferably, trailer wheel brace 32 includes vertical brace members 48 and 49 for abutting the interior sides of trailer wheels 18. Vertical brace members 48 and 49 extend a distance upward from wheel tracks 42 and 43, allowing the trailer wheel brace 32 to abut the inner edge of trailer wheels 18 and to provide lateral support when trailer 14 is being carried by trailer recovery vehicle A, thereby preventing trailer from shifting laterally sideways during transport. The vertical brace members 48 and 49 also serve to guide trailer wheels 18 onto the wheel support tracks 42 and 43 when mounting the trailer 14 upon the trailer recovery vehicle A. Preferably, the height of vertical brace members 48 and 49 should be limited to avoid impinging upon the axle or undercarriage of trailer 14. In addition to providing lateral stability to trailer wheels 36, trailer wheel brace 32 may also define a telescoping member housing 51 for housing forward telescoping member 50.

Forward telescoping member 50 extends forward from telescoping member housing 51. Forward telescoping member 50 includes an outer frame 52 stabilized by crossbars 54 to minimize the weight of the assembly. A locking mechanism 56 is provided along the outer frame of forward telescoping member 50 for locking the telescoping member 50 at a desired position with forward telescoping member housing 51 to provide trailer recovery vehicle A with a length sufficient for towing trailer 14 and also connecting to tractor unit 12. In the preferred embodiment, locking mechanism 56 consists of a pair of locking pins 58 which may be inserted through locking pin holes 62 in forward telescoping member housing 51 and through one of a series of extension adjustment holes 60 spaced lengthwise along forward telescoping member 50. One skilled in the art will recognize that other locking systems could be used to lock forward telescoping member 50 at a desired position.

As shown in FIGS. 2 and 3, a jack 38 is carried by front telescoping member 50 for lifting the front end of trailer recovery vehicle A, thereby allowing the trailer recovery vehicle connector 40 to be positioned in a vertical alignment appropriate for interconnection to the undercarriage connector 28 of tractor unit 12. Jack 38 is preferably a pneumatic jack which may be powered either by connection to the pneumatic system of tractor unit 12 or by a separate compressor. Alternatively, jack 38 could also be hand powered or electrically operated.

As shown in FIG. 3 and FIG. 4, trailer recovery vehicle connector 40 extends from the front telescoping member 50 to facilitate the pivotable connection of the trailer recovery vehicle A to the undercarriage connector 28 of tractor unit 12. Additionally, when engaged, trailer recovery vehicle connector 40 and undercarriage connector 28 should be positioned directly below the fifth wheel connector 26 so that they share a common axis of rotation with the fifth wheel connector, thereby allowing the tractor unit 12 and the trailer recovery vehicle A to turn freely over a limited range in a horizontal plane with respect to one another. This allows the tractor operator to steer normally when towing trailer 14 upon trailer recovery vehicle A.

In the preferred embodiment, trailer recovery vehicle connector 40 includes a large horizontal eyebolt 66 and undercarriage connector 28 of tractor unit 12 includes a pintle hook 64 disposed to receive and securely engage eyebolt 66. However, one of ordinary skill in the art will recognize that a number of similarly pivotable connection systems could be utilized to connect the trailer recovery vehicle A to the tractor unit 14 as long as a common axis of rotation is maintained to allow the tractor unit 12 to turn with respect to the trailer recovery vehicle A.

As shown in FIGS. 2 and 4, safety cables 88 are attached to forward telescoping member 50 to either side of trailer recovery vehicle connector 40 to provide an additional level of security should the connection between trailer recovery vehicle connector 40 and tractor undercarriage connector 28 fail during transport. Safety cables 88 terminate in hooks which are easily attached to undercarriage safety cable connection hooks 90 provided at the rear of tractor unit 12.

As illustrated in FIG. 5 through FIG. 7, the above described trailer recovery vehicle is used to transport an unroadworthy trailer according to the following method. As shown in FIG. 5, a tractor unit 12 and a trailer 14 are provided in a staging area wherein they are assembled into a configuration appropriate for transport. At this point, trailer recovery vehicle A is adjusted to a length appropriate to accommodate the trailer 14 by extending and locking forward telescoping member 50 at the desired length.

As shown in FIG. 6, tractor unit 12 is then backed into a position for connection to trailer 14. Trailer 14 is then attached to tractor unit 12 by engaging trailer fifth wheel connector pin 20 with tractor fifth wheel connector 26. At this point, tractor unit 12 may be used to transport trailer 14 about the staging area in the conventional manner commonly used for highway transport of trailers.

Next, as shown in FIG. 7, tractor unit 12 maneuvers trailer 14 onto the trailer recovery vehicle A. Since jack 38 has not yet been deployed, the trailer recovery vehicle A is disposed with its front end tilted toward the ground, allowing support track front sides 44 and 45 to function as ramps. Trailer 14 can therefore be easily loaded onto the trailer recovery vehicle A by simply rolling it back onto the wheel support tracks 42 and 43. Trailer wheel brace 32 may abut the inner side of trailer wheels 18 to guide them onto the wheel support tracks 42 and 43. During transport, trailer wheel brace 32 provides lateral support to trailer 14 and prevents trailer 14 from shifting laterally sideways while being carried by trailer recovery vehicle A.

Jack 38 is then connected to the pneumatic supply line 70 of tractor unit 12 and is deployed to raise the front end of trailer recovery vehicle A into a position allowing trailer recovery vehicle connector 40 to be interconnected with tractor undercarriage connector 28 at a position directly below engaged tractor fifth wheel connector 26 and trailer fifth wheel connector pin 20. The trailer recovery vehicle connector 40 and tractor undercarriage connector 28 are then engaged and jack 38 is retracted. At this point, the trailer is supported upon trailer recovery vehicle A and is pivotably connected via its fifth wheel connector pin 20 to tractor unit 12. Since trailer recovery vehicle A is pivotably attached via its forward connector 40 to the undercarriage connector of tractor unit 12 in axial alignment with the fifth wheel connectors 20 and 26, the tractor unit 12, trailer 14 and trailer recovery vehicle A may all pivot together without binding when the tractor unit 12 is steered in normal operation. Ideally, the resulting steering characteristics of a tractor 12 when towing a trailer 14 mounted upon a trailer recovery vehicle A should be similar to those that would be obtained when towing a trailer 14 alone in normal operation.

Pneumatic supply line 70 is then disconnected from jack 38 and connected to pneumatic line 86 to supply air to the air brake assembly (not shown) of trailer recovery vehicle A. Trailer recovery vehicle signal control harness 78 is then connected to tractor signal control cable 72 to provide for control of the turn signal lights and brake lights (not shown) mounted on trailer recovery vehicle axle housing 34. The trailer recovery vehicle safety cables 88 are then attached to the tractor undercarriage safety cable connection hooks 90 to provide an additional level of security should trailer recovery vehicle connector 40 and tractor undercarriage connector 28 become disengaged during transport.

Thus, it can be seen that an advantageous method may be had for transporting a trailer, which fails to meet current highway safety standards, according to the present invention, wherein the trailer is attached to a tractor in normal fashion via a fifth wheel connector. The unsafe trailer is mounted upon a trailer recovery vehicle which is connected to the tractor along the same axis of rotation as the fifth wheel connector to allow safe transport with minimal effects upon trailer dimensions and handling.

What have been described above are preferred embodiments of the present invention. However, one of ordinary skill in the art will recognize that many further combinations, permutations and modifications of the present invention are possible. Therefore, all such possible combinations, permutations and modifications are to be included within the scope of the claimed invention, as defined by the claims below.

What is claimed is:

1. A trailer recovery vehicle for transporting a trailer towed by a tractor, wherein said trailer has a body and wheels and is pivotably mounted to said tractor at a position defining an axis of rotation, said trailer recovery vehicle comprising:

a generally horizontal support platform for being mounted underneath said trailer for supporting said trailer in a horizontal position, said support platform having wheels for providing said support platform with mobility;

a trailer wheel brace carried by said support platform for bracing a wheel of said trailer for preventing lateral shifting of said trailer when said trailer is carried by said support platform; and a connector carried by said support platform for connecting said support platform to said tractor enabling said support platform and said trailer to be transported simultaneously;

whereby said trailer mounted to said tractor is supported above the road surface and transported by said trailer recovery vehicle when said tractor simultaneously pulls said trailer recovery vehicle and said trailer.

2. The trailer recovery vehicle of claim 1, wherein said connector is a pivotable connector for being attached in axial alignment with said axis of rotation, enabling said support platform to turn without binding when said tractor is steered.

3. The trailer recovery vehicle of claim 1, wherein said wheel brace includes a vertical stop rising to a height above said support platform for abutting an interior portion of a wheel of said trailer.

4. The trailer recovery vehicle of claim 1, wherein said wheel brace comprises a raised central portion extending along a general length of said support platform for being disposed between the wheels of said trailer to provide a stop for abutting said wheels of said trailer, thereby preventing said trailer from sliding laterally off said support platform.

5. The trailer recovery vehicle of claim 1, wherein said support platform wheels have a vertical height and wherein said support platform includes wheel support tracks for supporting said wheels of said trailer, said wheel support tracks being disposed at an elevation lower than said vertical height of said support platform wheels, thereby minimizing the height at which said trailer is supported.

6. The trailer recovery vehicle of claim 5, wherein each of said wheel support tracks includes a front side defining a ramp for allowing said trailer to be rolled onto said respective wheel support track.

7. The trailer recovery vehicle of claim 1, further including a jack for positioning said connector in appropriate alignment with said tractor for connecting said trailer recovery vehicle with said tractor.

8. The trailer recovery vehicle of claim 1, further including an extensible member telescopically carried by said support platform for allowing said support platform to support trailers of differing lengths.

9. A recovery vehicle for carrying a trailer, wherein said trailer has a body and wheels and is pivotably mounted to a tractor at a position defining an axis of rotation, said carrying vehicle comprising:

a support platform for being mounted underneath said trailer for supporting said trailer, said support platform having wheels for providing said support platform with mobility; and a connector for pivotably connecting said support platform to said tractor along an axis aligned with said axis of rotation, thereby allowing said recovery vehicle to turn relative to said tractor, whereby said trailer mounted to said tractor may be supported above the road surface for transport by said trailer recovery vehicle when said tractor pulls said trailer recovery vehicle.

10. The trailer recovery vehicle of claim 9, further including a rear portion defining a stop for preventing said trailer from sliding off the rear of said support platform.

11. The trailer recovery vehicle of claim 10, further including a wheel brace comprising a raised central portion extending along a general length of said support platform for being disposed between the wheels of said trailer to provide a stop for abutting said wheels of said trailer, thereby preventing said trailer from sliding laterally off said support platform.

12. The trailer recovery vehicle of claim 9, wherein said support platform wheels have a vertical height and wherein said support platform includes wheel support tracks for supporting said wheels of said trailer, said wheel support tracks being disposed at an elevation lower than said vertical height of said support platform wheels, thereby minimizing the height at which said trailer is supported.

13. The trailer recovery vehicle of claim 9, wherein said support platform includes a wheel support track having a front side, said front side defining a ramp for allowing said trailer to be rolled onto said wheel support track.

14. The trailer recovery vehicle of claim 9, further including a jack for positioning said connector in appropriate alignment with said tractor for connecting said trailer recovery vehicle with said tractor.

15. The trailer recovery vehicle of claim 9, wherein said support platform includes a telescoping member carried by said support platform for allowing said support platform to support trailers of differing lengths.

* * * * *